Oct. 26, 1965 J. J. HICKEY 3,214,633

PUSH-PULL STAIRCASE VOLTAGE GENERATING CIRCUIT

Filed May 27, 1963

INVENTOR.
JOHN J. HICKEY

BY Jerry A. Dinardo

AGENT 3,214,633

PUSH-PULL STAIRCASE VOLTAGE GENERATING CIRCUIT

John J. Hickey, Hawthorne, Calif., assignor, by mesne assignments, to TRW Inc., a corporation of Ohio Filed May 27, 1963, Ser. No. 283,503
10 Claims. (Cl. 315—29)

Figure 1:
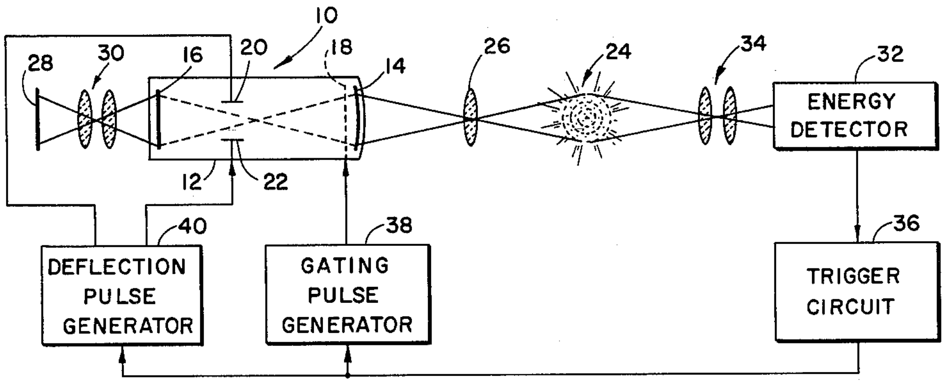

This invention relates to improvements in staircase voltage generators, and particularly to an improved circuit for generating relatively high push-pull voltages of stepped waveform, with the steps having fast rise times of less than a microsecond.

In certain applications which utilize image tubes and cathode ray tubes of low electrostatic deflection sensitivity, such as high speed electronic cameras and oscillographs, it is sometimes required to deflect the electron beam in a series of rapidly recurring discrete steps. For this purpose it is necessary to provide push-pull deflection voltages that have a stepped waveform. A circuit which generates such a stepped waveform is commonly known as a staircase generator because of the superficial resemblance of the stepped wavefrom to a flight of stairs. In a balanced deflection system two push-pull waveforms, that is two waveforms that are equal in amplitude and opposite in polarity are used. Thus, a staircase waveform which rises in voltage may be applied to one deflection plate while a staircase waveform which decreases in voltage is applied to the opposite deflection plate. For high speed deflection it is necessary for each of the voltage steps to change through an amplitude of several hundred volts in less than a microsecond.

It is therefore an object of this invention to provide a circuit for generating voltages of stepped waveform wherein each of the steps changes by several hundred volts in less than a microsecond.

A further object is to provide an improved circuit for generating staircase waveforms useful in producing balanced electrostatic deflection of an electron beam.

In accordance with an embodiment of this invention, a voltage divider network is formed across six terminals. Equal resistances are connected across the first and second terminals, across the second and third terminals, across the fourth and fifth terminals, and across the fifth and sixth terminals, the third and fourth terminals being normally open circuited. A unidirectional voltage is impressed across the first and sixth terminals.

Between the third and fourth terminals is connected a first switching device, such as a normally nonconducting thyratron tube, which is adapted to close the circuit between those terminals in response to a first trigger pulse. Between the second and fifth terminals is a second switching device similar to the first, which is adapted to effectively short circuit the path between those terminals in response to a second trigger pulse.

When the first and second switching devices are switched in succession, two staircase voltage waveforms of equal amplitude and opposite polarity are produced at the second and fifth terminals.

Figure 2:
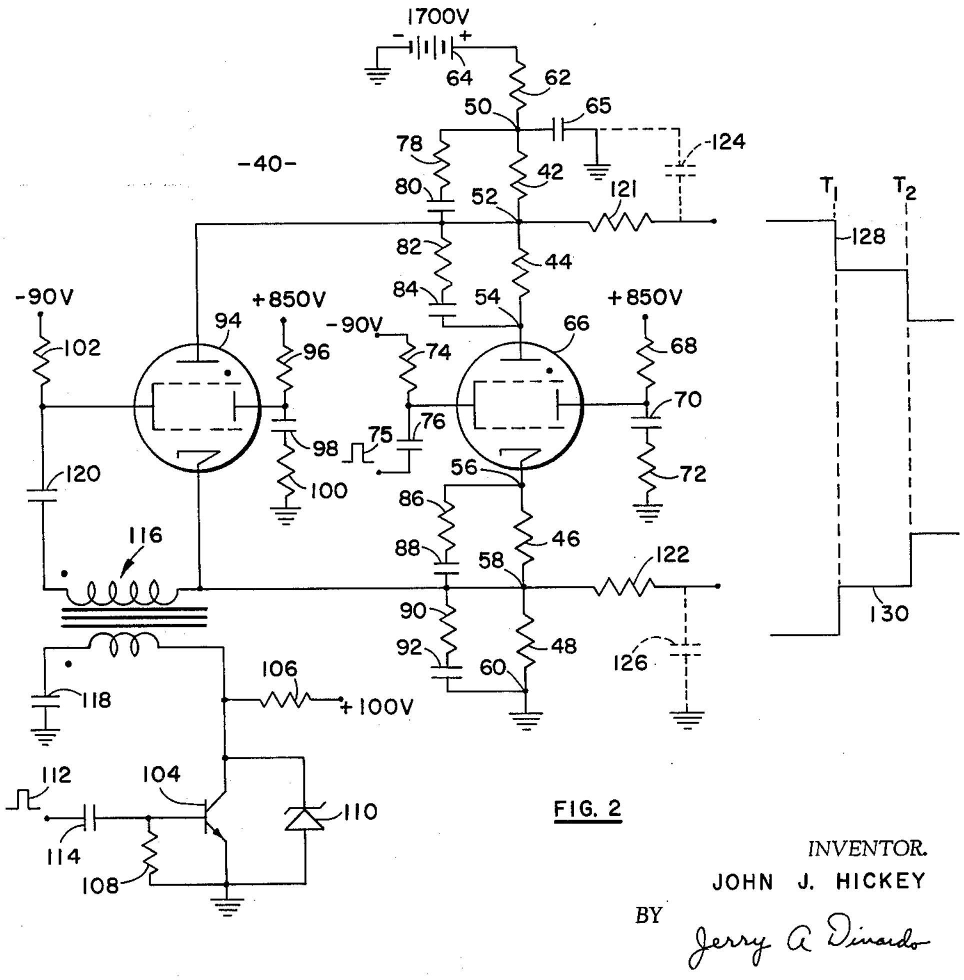

In the drawing:

FIG. 1 is a block diagram of an electronic camera system in which the staircase voltage generating circuit finds utility; and FIG. 2 is a schematic diagram of one embodiment of the staircase voltage generating circuit according to the invention.

Referring now to the drawing, FIG. 1 is a block diagram of an electronic camera system employing a staircase generator for balanced deflection according to the invention. The electronic camera system includes as one of its principal components an image converter tube 10 which functions primarily as a high speed shutter. Another function of the image converter tube 10 is that of providing light amplification for the extremely short frame times involved in its high speed photographic operation.

The image converter tube 10 comprises essentially a cylindrical evacuated envelope 12 containing a photemissive cathode or photocathode 14 at one end, a fluorescent screen 16 at the other end, a control grid 18 adjacent to the photocathode 14, and a pair of deflection plates 20 and 22 intermediate the control grid 18 and the fluorescent screen 16. Certain other parts and components essential to the operation of the tube 10 are omitted for simplicity, since these are well known. For example, the tube 10 ordinarily contains additional electrode such as an anode and focusing electrodes and also requires a high voltage supply. It will suffice to say that the tube may be one of the kind manufactured by RCA and bearing the developmental type number C 73435A.

In the operation of the electronic camera for the purpose of photographing high speed transient phenomena, light from an object 24 is focused by a lens 26 onto the photocathode 14 of the image converter tube 10. The electron image emitted from the photocathode 14 is normally prevented from reaching the fluorescent screen 16 by the application of a sufficiently high negative blanking voltage to the control grid 18 relative to the photocathode 14.

A rapid series of frames or exposures of the phenomenon or object 24 can be taken by applying a series of positive rectangular gating voltage pulses to the control grid 18. The gating voltage pulses are sufficiently large, such as 300 volts, to unblank the grid 18 and permit the electron image to be accelerated towards the fluorescent screen 16. The different frames or exposures may be reproduced side-by-side on the fluorescent screen 16 by applying deflection voltages to the deflection plates 20 and 22 respectively, between and during successive gating pulses. The amplified light images appearing on the fluorescent screen 16 are then projected onto a photographic film 28 by means of a lens system 30. In practice, the film 28 may be part of a camera of the type which allows rapid development of the exposed film 28.

A gating signal for actuating the image converter tube 10 is developed in a circuit which includes an electromagnetic energy detector 32 exposed through a lens system 34 to the phenomenon or object 24 to be recorded. The beginning of the event for example, may be manifested by the initial emission of light from the object 24. In such case, the detector 32 may comprise a phototube circuit which converts the light into an electrical signal. The electrical signal is fed to a trigger circuit 36 to develop an amplified trigger pulse or a series of pulses of sufficient magnitude to drive a gating pulse generator 38 and a deflection pulse generator 40 which generate the desired gating and deflection pulses for operating the image converter tube.

Reference is now made to FIG. 2 which shows the deflection pulse generator 40 in greater detail. The deflection pulse generator 40 is a circuit which produces two complementary staircase waveforms to provide balanced deflection of the electron image generated within the image converter tube 10. The generator 40 includes a voltage divider network having resistors 42, 44, 46, and 48 of equal resistance value connected across terminals 50 and 52, across terminals 52 and 54, across terminals 56 and 58, and across terminals 58 and 60, respectively. A resistor 62 of much higher resistance value than resistors 42–48 is connected between terminal 50 and the positive side of a source 64 of unidirectional voltage, say of 1700 volts. The negative side of the source 64 is returned to ground, as is terminal 60. A capacitor 65 is connected between terminal 50 and ground.

An initially nonconducting thyratron 66 has its anode connected to terminal 54 and its cathode connected to terminal 56. The accelerating electrode is connected through a resistor 68 to a relatively high positive potential, say 850 volts. A capacitor 70 and a resistor 72 are connected in series between the accelerating electrode and ground. The control electrode is biased beyond cutoff by connection through a resistor 74 to a negative potential, say of 90 volts. A trigger pulse 75 may be applied to the control electrode through a coupling capacitor 76 to render the tube 66 conducting and thereby to effectively short circuit the path between terminals 54 and 56.

Across each of the resistors 42–48 is connected a series resistor and capacitor as follows: resistor 78 and capacitor 80 across resistor 42, resistor 82 and capacitor 84 across resistor 44, resistor 86 and capacitor 88 across resistor 46, and resistor 90 and capacitor 92 across resistor 48.

A circuit for short circuiting the path between terminals 52 and 58 in response to a second trigger pulse includes another thyratron 94 whose anode is connected to terminal 52 and whose cathode is connected to terminal 58. The accelerating electrode is connected through a resistor 96 to a relatively high positive potential, say of 850 volts. A capacitor 98 and resistor 100 are connected in series between the accelerating electrode and ground. A bias voltage of about 90 volts negative applied to the control grid through a resistor 102 maintains the thyratron 84 initially nonconducting.

A triggering circuit for rendering the thyratron 94 conducting includes an n-p-n transistor 104 having a grounded emitter and having its collector connected to a positive potential of 100 volts through a resistor 106. A resistor 108 is connected between the base and emitter. A Zener diode 110 has its anode connected to the emitter and its cathode connected to the collector of the transistor 104. A trigger pulse 112 may be coupled to the base of the transistor through a coupling capacitor 114. The collector is connected in series with the primary of a pulse transformer 116 and a capacitor 118. The secondary of the pulse transformer 116 is connected in series with a capacitor 120 in the grid circuit of the thyratron 94.

Terminal 52 forms one output terminal and terminal 58 forms the other output terminal. Damping resistors 121 and 122 are preferably connected in the output circuits to dampen any oscillations which might occur in the deflection circuits, shown in the phantom as capacitive loads 124 and 126.

The operation of the deflection pulse generator 40 will now be described. In the quiescent state, prior to the application of either of the trigger pulses 75 and 112, the thyratrons 66 and 94 are nonconducting and hence each forms an open circuit across its respective anode and cathode. Thus an open circuit exists between terminals 54 and 56, across which thyratron 66 is connected, and between terminals 52 and 58, across which thyratron 94 is connected. Likewise transistor 104 is nonconducting and an open circuit exists across its collector and emitter. Capacitor 65 is charged to a positive potential of 1700 volts, capacitors 70 and 98 are each charged to a positive potential of 850 volts, and capacitor 118 is charged to a positive potential of 100 volts. Terminals 50, 52 and 54 are therefore all at a positive potential of 1700 volts and terminals 56, 58, and 60 are all at ground potential.

A positive trigger pulse 75 coupled to the grid of the thyratron 66 fires the latter. When the thyratron 66 is fully ionized, the voltage drop between the anode and cathode is only 20 or 30 volts, so that terminals 54 and 56 are then effectively short circuited to produce a discharge path for capacitor 65. When capacitor 65 discharges, the discharge current produces substantially equal voltage drops across the four series resistors 42, 44, 46, and 48. As a result, the potential at output terminal 52 drops approximately 425 volts and the potential of output terminal 58 rises about 425 volts. Capacitor 70, which is charged to a potential equal to half the entire voltage across the entire divider network, discharges through the accelerating anode to cathode circuit of thyratron 66 and through resistors 46 and 48 to assure that the potential at the terminal 56 is substantially one half that at terminal 50. In other words, capactor 70 maintains the voltage drop across resistors 46 and 48 equal to the voltage drop across resistors 42 and 44, thereby equalizing the step voltages produced at terminals 58 and 52, respectively. Capacitor 70 is used to compensate for any unbalance arising from different current paths through the thyratron 66. For example, the flow of grid current tends to reduce the cathode current below that of the anode current, with the result that the voltage drop across terminals 56 and 60 would tend to be less than that across terminals 50 and 54. The step voltages are shown as occuring at time $T_1$ in the waveforms 128 and 130, $T_1$ being the time at which the trigger pulse 75 is applied.

Since the deflection circuits appear as capacitive loads 124 and 126 shunting the resistors 42 and 48 and into which the capacitor 65 must discharge, the resistors 44 and 46 would slow down the charging of the capacitive loads 124 and 126, unless they were shunted by capacitors 84 and 88. The capacitors 84 and 88 thus provide a low impedance path through which the capacitive loads can charge and thus tend to sharpen the initial voltage steps. While it would be sufficient to shunt the two resistors 44 and 46 above, it would be necessary to match the shunting capacitances with those of the capacitive loads 124 and 126, which in practice is not easily achieved. To avoid the problem of matching, capacitors 80 and 92 are provided across resistors 42 and 48. All shunt capacitors 80, 84, 88, and 92 are of equal capacitance value and are much larger than the capacitances of the capacitive loads 124 and 126, say by a factor of at least 100 to 1. Thus any changes in the capacitance of the loads 124 and 126 will not be reflected in the total capacitance and the division of voltage across the four sections of the divider network will be equal. The series resistors 78, 82, 86, and 90, which are of small resistance value, limit the current flow through the thyratron 66 and also tend to dampen any oscillations that might occur. Preferably they are made equal to insure an equal division of voltage across resistors 42 to 48 during the first few nanoseconds of the capacitive discharge.

To recapitulate, when thyratron 66 fires, the capacitive load 126 is charged, and the capacitive load 124 is discharged quickly and equally by approximately one-fourth of the potential of the capacitor 65, neglecting thyratron tube drop. A negative step voltage of 425 volts is produced at terminal 52 and a positive step voltage of 425 volts is produced at terminal 58.

In charging the shunt capacitors 80 to 92 the capacitor 65 loses a slight amount of its charge and then continues to discharge slowly through the four series resistors 42 to 48 and the thyratron 66. Once the shunt capacitors 80 to 92 have been charged they will discharge slowly through the resistors 42 to 48 which are in shunt therewith. The capacitor 65 has a sufficiently large capacitance to maintain the voltage across the divider network close to 1700 volts when the next trigger pulse 112 is applied at time $T_2$, say within 10 microseconds after time $T_1$.

The second trigger pulse 112 is applied to the base of the transistor 104 through capacitor 114, driving the base positive and causing current to flow in the base-emitter circuit. It may be noted at this point that the Zener diode 110 prevented the transient caused by the 425 volt positive step appearing at terminal 58 and capacitively coupled through the transformer 116 from previously breaking down the transistor across the collector-emitter circuit. When the base to emitter current flows, however, the transistor is caused to conduct current in the collector-emitter circuit, rapidly driving the collector potential negatively towards ground. Capacitor 118 discharges rapidly through the collector-emitter circuit producing a surge of current through the primary of the pulse transformer 116. The current surge is amplified and inverted in the secondary to produce a positive going pulse that is coupled to the grid of thyratron 94, triggering the latter into a conducting state.

When thyratron 94 fires, it effectively short circuits terminals 52 and 58. Capacitive load 126 is charged and capacitive load 124 is discharged quickly and equally to a potential equal to one half of that on the capacitor 65. Capacitor 98 discharges through the accelerating electrode to cathode circuit to maintain terminals 52 and 58 at approximately 850 volts. Thus, it serves a purpose equivalent to that of capacitor 70 in the accelerating electrode circuit of thyratron 66.

In a manner similar to that described above in connection with the generation of the first voltage steps, the charging of capacitive load 126 and discharging of capacitive load 124 will produce a second positive step at terminal 58 and a second negative step at terminal 52, indicated on the waveforms 130 and 128 as occurring at time $T_2$.

Thereafter capacitors 80 and 92 will discharge through resistors 42 and 48, and capacitor 65 will continue to discharge through thyratron 94 in preference to the higher resistance path through thyratron 66 and resistors 44 and 46. When current flow through thyratron 66 stops, conduction through the latter ceases. Conduction through thyratron 94 ceases when the discharge current from capacitors 65 and 98 falls below the deionizing current of the tube. Charging resistor 62 is sufficiently high to limit the steady state current from source 64 to a value below that required to sustain ionization of both tubes 94 and 66.

When conduction in both thyratrons ceases, the circuit returns to its original quiescent condition ready for generation of another pair of staircase voltages. It should be noted that in addition to providing oscillation damping, resistors 72 and 100 in the accelerating electrode circuits of thyratrons 66 and 94 develop excellent negative spike pulses which can be used to trigger the gating pulse generator 38 (FIG. 1). This will insure a completedeflection of the electron beam prior to the application of gating pulses to the gating grid 18 of the image converter tube 10.

The following circuit components and values were used in a successfully operated circuit.

| | | |
|---|---|---|
| Resistor **42** | kilohms | 10 |
| Resistor **44** | do | 10 |
| Resistor **46** | do | 10 |
| Resistor **48** | do | 10 |
| Resistor **62** | megohms | 2 |
| Source **64** | volts | 1700 |
| Capacitor **65** | microfarad | .05 |
| Thyratron **66** | Type | 2D21 |
| Resistor **68** | megohm | 1 |
| Capacitor **70** | microfarad | .005 |
| Resistor **72** | ohms | 10 |
| Resistor **74** | kilohms | 100 |
| Capacitor **76** | picofarads | 100 |
| Resistor **78** | ohms | 51 |
| Capacitor **80** | microfarad | .001 |
| Resistor **82** | ohms | 51 |
| Capacitor **84** | microfarad | .001 |
| Resistor **86** | ohms | 51 |
| Capacitor **88** | microfarad | .001 |
| Resistor **90** | ohms | 51 |
| Capacitor **92** | microfarad | .001 |
| Thyratron **94** | Type | 2D21 |
| Resistor **96** | megohm | 1 |
| Capacitor **98** | microfarad | .005 |
| Resistor **100** | ohms | 10 |
| Resistor **102** | kilohms | 100 |
| Transistor **104** | Type | 2N699 |
| Resistor **106** | megohms | 3 |
| Resistor **108** | ohms | 100 |
| Zener diode **110** | | 1N985 |
| Capacitor **114** | picofarads | 100 |
| Capacitor **118** | microfarad | .001 |
| Capacitor **120** | do | .02 |
| Resistor **121** | ohms | 51 |
| Resistor **122** | do | 51 |

While the invention is not limited to the use of any particular type of thyratron or to a particular method of thyratron operation, improved switching speeds may be realized by utilizing a tetrode such as a type 2D21 for the thyratrons 66 and 94. When such a tube type is used, it is preferred to make connections to the tube such that hte electrode which is conventionally called the shield is utilized as the control grid, and the electrode which conventionally serves as the control grid is utilized as the accelerating electrode, as shown and described herein.

The embodiments of the invention in which an exclusive property or privilege is claimed are defined as follows:

1. A push-pull staircase voltage generating circuit, comprising:

first, second, third, fourth, fifth, and sixth terminals;

a resistor connected between said first and second terminals;

a resistor connected between said second and third terminals;

a first thyratron connected in series with said third and fourth terminals and selectively energizable to provide a low impedance path between said third and fourth terminals;

a resistor connected between said fourth and fifth terminals;

a resistor connected between said fifth and sixth terminals;

said four resistors being of equal resistance value;

means for applying a unidirectional voltage across said first and sixth terminals;

and a second thyratron connected across said second and fifth terminals and selectively energizable to provide a low impedance path between said second and fifth terminals;

whereby when said first and second thyratrons are successively energized in that order, a first stepped voltage of one polarity is derived across said second and sixth terminals and a second stepped voltage of opposite polarity is derived across said fifth and sixth terminals.

2. A push-pull staircase voltage generating circuit, comprising:

first, second, third, fourth, fifth, and sixth terminals;

a resistor connected between said first and second terminals:

a resistor connected between said second and third terminals;

a first thyratron including a cathode, a control grid, and an anode, with said anode connected to said third terminal and said cathode connected to said fourth terminal, said control grid being triggerable to fire said thyratron and thereby produce a low impedance path between said third and fourth terminals;

a resistor connected between said fourth and fifth terminals;

a resistor connected between said fifth and sixth terminals;

said four resistors being of equal resistance value;

a second thyratron similar to said first thyratron and having its cathode and anode connected to said fifth and second terminals respectively, the control grid of said second thyratron being triggerable to fire the same and thereby produce a low impedance path between said fifth and second terminals;
a capacitor connected between said first and sixth terminals;
means for charging said capacitor to a positive potential of sufficient magnitude to serve as initial anode operating potential for said thyratrons;
said first and second thyratrons being sequentially triggerable in that order by time spaced input pulses that are spaced by a time much shorter than the time constant of said capacitor in series with said four resistors, for producing a first staircase voltage of one polarity across said second and sixth terminals and a second staircase voltage of equal amplitude and opposite polarity across said fifth and sixth terminals.

3. A push-pull staircase voltage generating circuit, comprising:
first, second, third, fourth, fifth, and second terminals;
a resistor connected between said first and second terminals;
a resistor connetced between said second and third terminals;
a first thyratron including a cathode, a control grid, and an anode, with said anode connected to said third terminal and said cathode connected to said fourth terminal, said control grid being triggerable to fire said thyratron and thereby produce a low impedance path between said third and fourth terminals;
a resistor connected between said fourth and fifth terminals;
a resistor connected between said fifth and sixth terminals;
said four resistors being of equal resistance value;
a second thyratron similar to said first thyratron and having its cathode and anode connected to said fifth and second terminals respectively, the control grid of said second thyratron being triggerable to fire the same and thereby produce a low impedance path between said fifth and second terminals;
a current limiting resistor connected to said first terminal;
a source of unidirectional voltage connectable in series between said current limiting resistor and said sixth terminal, with the positive side of said source connectable with said current limiting resistor;
said current limiting resistor having an appreciably greater resistance valve than any of said four resistors;
a capacitor connected between said first and sixth terminals and chargeable to the potential of said voltage source;
and a capacitor and an additional resistor connected in series across each of said four resistors, said additional resistor having a resistance value appreciably smaller than each of said four resistors;
said first and second thyratrons being sequentially triggerable in that order for producing a first staircase voltage of one polarity across said second and sixth terminals and a second staircase voltage of equal amplitude and opposite polarity across said fifth and sixth terminals.

4. A push-pull staircase voltage generating circuit, comprising:
first, second, third, fourth, fifth, and sixth terminals;
a resistor connected between said first and second terminals;
a resistor connected between said first and second terminals;
a resistor connected between said second and third terminals;
a first thyratron provided with a cathode, a control grid, an accelerating electrode and an anode, with said anode connected to said third terminal and said cathode connected to said fourth terminal, said control grid being triggerable to fire said thyratron and thereby produce a low impedance path between said third and fourth terminals;
a resistor connected between said fourth and fifth terminals;
a resistor connected between said fifth and sixth terminals;
said four resistors being of equal resistance value;
a second thyratron similar to said first thyratron and having its cathode and anode connected to said fifth and second terminals respectively, the control grid of said second thyratron being triggerable to fire the same and thereby produce a low impedance path between said fifth and second terminals;,
a current limiting resistor connected to said first terminal;
a source of unidirectional voltage connectable in series between said current limiting resistor and said sixth terminal, with the positive side of said source connectable with said current limiting resistor;
said current limiting resistor having an appreciably greater resistance value than any of said four resistors;
a capacitor connected in the accelerating electrode circuit of each of said thyratrons and chargeable to a positive potential equal to one half that of said voltage source;
a capacitor connected between said first and sixth terminals and chargeable to the potential of said voltage source;
and a capacitor and an additional resistor connected in series across each of said four resistors, said additional resistor having a resistance value appreciably smaller than each of said four resistors;
said first and second thyratrons being sequentially triggerable in that order for producing a first staircase voltage of one polarity across said second and sixth terminals and a second staircase voltage of equal amplitude and opposite polarity across said fifth and sixth terminals.

5. A push-pull staircase voltage generating circuit adapted for use in electrostatic deflection circuits having a predetermined input capacitance, comprising:
first, second, third, fourth, fifth, and sixth terminals;
a resistor connected between said first and second terminals;
a resistor connected between said second and third terminals;
a first thyratron provided with a cathode, a control grid, an accelerating electrode and an anode, with said anode connected to said third terminal and said cathode connected to said fourth terminal, said control grid being triggerable to fire said thyratron and thereby produce a low impedance path between said third and fourth terminals;
a resistor connected between said fourth and fifth terminals;
a resistor connected between said fifth and sixth terminals;
said four resistors being of equal resistance value;
a second thyratron similar to said first thyratron and having its cathode and anode connected to said fifth and second terminals respectively, the control grid of said second thyratron being triggerable to fire the same and thereby produce a low impedance path between said fifth and second terminals;
a current limiting resistor connected to said first terminal;
a source of unidirectional voltage connectable in series between said current limiting resistor and said sixth terminal, with the positive side of said source connectable with said current limiting resistor;
said current limiting resistor having an appreciably greater resistance value than any of said four resistors;
a capacitor connected in the accelerating electrode circuit of each of said thyratrons and chargeable to a positive potential equal to one half that of said voltage source;

a capacitor connected between said first and sixth terminals and chargeable to the potential of said voltage source;

and a capacitor and an additional resistor connected in series across each of said four resistors, said capacitor having an appreciably larger capacitance than that of said deflection circuits, and said additional resistor having a resistance value appreciably smaller than each of said four resistors;

said first and second thyratrons being sequentially triggerable in that order for producing a first staircase voltage of one polarity across said second and sixth terminals and a second staircase voltage of equal amplitude and opposite polarity across said fifth and sixth terminals.

6. A push-pull staircase voltage generating circuit, comprising:

first, second, third, fourth, fifth, and sixth terminals;

a resistor connected between said first and second terminals;

a resistor connected between said second and third terminals;

a first thyratron including a cathode, a control grid, and an anode, with said anode connected to said third terminal and said cathode connected to said fourth terminal, said control grid being triggerable to fire said thyratron and thereby produce a low impedance path between said third and fourth terminals;

a resistor connected between said fourth and fifth terminals;

a resistor connected between said fifth and sixth terminals;

said four resistors being of equal resistance value;

a second thyratron similar to said first thyratron and having its cathode and anode connected to said fifth and second terminals respectively, the control grid of said second thyratron being triggerable to fire the same and thereby produce a low impedance path between said fifth and second terminals;

a current limiting resistor connected to said first terminal;

a source of unidirectional voltage connectable in series between said current limiting resistor and said sixth terminal, with the positive side of said source connectable with said current limiting resistor;

said current limiting resistor having an appreciably greater resistance value than any of said four resistors;

a discharge capacitor connected between said first and sixth terminals and chargeable to the potential of said voltage source;

and a capacitor and an additional resistor connected in series across each of said four resistors, said capacitor having a capacitance value that is appreciably smaller than that of said discharge capacitor, and said additional resistor having a resistance value appreciably smaller than each of said four resistors;

said first and second thyratrons being sequentially triggerable in that order for producing a first staircase voltage of one polarity across said second and sixth terminals and a second staircase voltage of equal amplitude and opposite polarity across said fifth and sixth terminals.

7. A push-pull staircase voltage generating circuit, comprising;

first, second, third, fourth, fifth, and sixth terminals;

a resistor connected between said first and second terminals;

a resistor connected between said second and third terminals;

a first thyratron provided with a cathode, a control grid, an accelerating electrode and an anode, with said anode connected to said third terminal and said cathode connected to said fourth terminal, said control grid being triggerable to fire said thyratron and thereby produce a low impedance path between said third and fourth terminals;

a resistor connected between said fourth and fifth terminals;

a resistor connected between said fifth and sixth terminals;

said four resistors being of equal resistance value;

a second thyratron similar to said first thyratron and having its cathode and anode connected to said fifth and second terminals respectively, the control grid of said second thyratron being triggerable to fire the same and thereby produce a low impedance path between said fifth and second terminals;

a current limiting resistor connected to said first terminal;

a source of unidirectional voltage connectable in series between said current limiting resistor and said sixth terminal, with the positive side of said source connectable with said current limiting resistor;

said current limiting resistor having an appreciably greater resistance value than any of said four resistors;

a first discharge capacitor connected in both anode circuits of said thyratrons and adapted to discharge current through said thyratrons from a potential equal to that of said source;

a second discharge capacitor connected in the accelerating anode circuit of said first thyratron and adapted to discharge current therethrough from a potential equal to one half that of said source;

and a third discharge capacitor connected in the accelerating anode circuit of said second thyratron and adapted to discharge current therethrough from a potential equal to one half that of said source;

said first and second thyratrons being sequentially triggerable in that order for producing a first staircase voltage of one polarity across said second and sixth terminals and a second staircase voltage of equal amplitude and opposite polarity across said fifth and terminals.

8. A push-pull staircase voltage generating circuit, comprising:

a first voltage divider network, a first normally open switch means, and a second voltage divider network connected in series in that order;

means for applying unidirectional voltage across the external ends of said voltage divider networks;

a second normally open switch means connected across internal taps of each of said voltage divider networks;

and means for energizing said first and second switch means successively in that order to form low impedance series connections therebetween, thereby to produce stepped voltages of opposite polarity at said internal taps.

9. The invention according to claim 8 wherein each of said voltage divider networks comprises at least two resistors of substantially equal resistance value.

10. The invention according to claim 8 wherein each of said switch means comprises a thyratron.

References Cited by the Examiner

UNITED STATES PATENTS 2,963,654 12/60 Jensen ---------------- 328—186

FOREIGN PATENTS 596,702 1/48 Great Britain.

DAVID G. REDINBAUGH, *Primary Examiner.*